(12) United States Patent
Pinnell

(10) Patent No.: US 8,424,138 B1
(45) Date of Patent: Apr. 23, 2013

(54) PORTABLE INFANT SEAT

(76) Inventor: Lisa A. Pinnell, Tulsa, OK (US)

( * ) Notice: Subject to any disclaimer, the term of this patent is extended or adjusted under 35 U.S.C. 154(b) by 45 days.

(21) Appl. No.: 13/155,063

(22) Filed: Jun. 7, 2011

Related U.S. Application Data

(60) Provisional application No. 61/353,462, filed on Jun. 10, 2010.

(51) Int. Cl.
*A47D 7/04* (2006.01)
*A47C 17/64* (2006.01)
*A47C 17/80* (2006.01)

(52) U.S. Cl.
USPC ........................... 5/655; 5/98.1; 5/118

(58) Field of Classification Search ............. 5/655, 98.1, 5/118, 94, 81.1 T, 89.1, 122, 123; 280/33.991–33.993
See application file for complete search history.

(56) References Cited

U.S. PATENT DOCUMENTS

| | | | |
|---|---|---|---|
| 1,204,416 A * | 11/1916 | Doser | 5/94 |
| 3,735,430 A | 5/1973 | Platz | |
| 4,221,424 A * | 9/1980 | Eiserman et al. | 296/152 |
| 4,602,816 A * | 7/1986 | Chandler | 296/63 |
| 4,651,366 A | 3/1987 | Lande et al. | |
| 4,679,840 A * | 7/1987 | Fry et al. | 296/64 |
| 4,807,314 A * | 2/1989 | Fry et al. | 5/118 |
| 4,971,343 A | 11/1990 | Wood | |
| 5,188,421 A * | 2/1993 | Arseneault | 297/182 |
| 5,265,893 A | 11/1993 | Ettlin | |
| 5,277,473 A | 1/1994 | Kelly et al. | |
| 5,470,039 A | 11/1995 | Hilger | |
| 5,778,465 A | 7/1998 | Myers | |
| 5,810,437 A | 9/1998 | Sharpe | |
| 5,918,891 A | 7/1999 | Russell | |
| 6,354,612 B1 | 3/2002 | Adamson | |
| 6,434,767 B1 | 8/2002 | Welsh, Jr. | |
| 6,450,513 B1 | 9/2002 | Bernstein | |
| 6,526,608 B1 | 3/2003 | Hsia | |
| 7,003,821 B2 | 2/2006 | DeHart et al. | |
| 7,404,219 B2 | 7/2008 | Berkey | |
| 7,458,114 B2 | 12/2008 | Troutman | |
| 7,530,635 B2 * | 5/2009 | Schramek-Flye | 297/255 |
| 7,832,037 B2 * | 11/2010 | Overton | 5/655 |
| 8,117,691 B2 * | 2/2012 | Bishop | 5/118 |
| 2009/0070930 A1 | 3/2009 | Roman | |
| 2009/0205131 A1* | 8/2009 | Bishop | 5/118 |
| 2010/0050338 A1* | 3/2010 | Overtone | 5/118 |

* cited by examiner

*Primary Examiner* — Robert G Santos
(74) *Attorney, Agent, or Firm* — Gable Gotwals

(57) ABSTRACT

A portable infant seat that rests between opposing sides of a shopping cart includes a sling made of flexible material and shaped to cradle an infant or an infant car seat. The ends of the sling cover a top rail portion of the shopping cart and stiffening means prevent the sling from folding over on itself when in use. The sling also includes attachment means that easily and releaseably secure the sling to the top rail the cart without any need for adjustment. The attachment means may be a J-style hook extending the entire length of each end. A safety strap may be provided at each end of the sling to provide a redundant or secondary level of safety should one or both of the attachment means fail.

12 Claims, 3 Drawing Sheets

PORTABLE INFANT SEAT

CROSS-REFERENCE TO PENDING APPLICATIONS

This application claims priority to U.S. Prov. Pat. Appl. No. 61/353,462, filed Jun. 10, 2010.

BACKGROUND OF THE INVENTION

This invention generally relates to apparatuses and methods for safely carrying an infant. More particularly, the invention relates to apparatuses and methods for safely carrying an infant on or within a shopping cart of the type designed to hold groceries, dry goods, or other items that a shopper wishes to purchase.

A parent or caregiver must often take an infant along on trips to the store. Because infants are not yet able to sit upright while unsupported, only a few options exist for allowing infants to safely ride in a shopping cart. None of the options are desirable. The first option is to place the infant in an infant car seat and rest the car seat inside the basket portion of the cart. However, because infant car seats tend to be rather large, this option prevents much of the shopping cart from being accessible to the parent and renders a significant portion of the cart unusable.

The second option is to balance the infant car seat toward the rear portion of the cart near the handlebar. However, an infant car seat is not designed for this purpose, tends to be unstable when used in this way, and makes the shopping cart top heavy. More importantly, it prevents a second child from using the child seat provided by the cart.

The third option is to use shopping carts provided at some retailers which include a built-in infant seat attached to the top, rear portion of the cart. However, this option eliminates the child seat portion of the cart for use by a second child. Additionally, this option requires that a shopper remove the infant from her or his infant car seat to be placed into the one provided by the cart. Removing an infant from a car seat is not desirable if the infant is asleep—many parents will not wake a sleeping baby to transfer her or him into another seat—or there is any type of inclement weather. Further, the built-in seats are made of hard plastic and are often left sitting out in the elements collecting dirt and grime.

The disadvantages of the above options have led some inventors to seek better ways of carrying an infant in a shopping cart. For example, U.S. Pat. App. Pub. No. 2009/0070930 discloses a hammock sling that includes interlocking straps and extension straps with fasteners to releaseably secure the sling to a shopping cart. However, the straps require proper adjustment and there is no guarantee that, once adjusted, the infant will be laying in the sling with his or her head in an elevated position. Additionally, the straps can become entangled with one another and attaching the clips or buckles to the cart sides takes time and is difficult to do with one hand. The straps can also become entangled with one another during storage. The design of the straps also provide several potential failure modes during use (e.g., improper adjustment or attachment due to cart design, strap disengaging from the sling, and fastener breaking or buckle breaking) and a potential safety hazard because an infant or second child could become entangled in the straps or the second child could loosen a fastener or unbuckle a buckle. Further, the sling is designed to carry the infant longitudinally aligned with the sides of the cart. This restricts access to the basket area of the cart. The sling cannot accommodate an infant car seat, which many parents use to transport their infant from their vehicle and into the store. Last, nothing prevents a user who forgets that an infant is resting in the sling from inadvertently attempting to stow the cart into a second cart.

SUMMARY OF THE INVENTION

A portable infant seat made and used according to this invention includes a sling made of one or more layers of flexible material and shaped to cradle an infant car seat. Alternatively, an infant may be placed directly in the sling. Because of the sling's design, the infant's head is elevated regardless of whether the infant is resting in the car seat on the sling or directly on the sling itself. Because the width of shopping carts can vary slightly (up to about 2 inches or so) from one type of cart to another, an adjustment strap may be provided on each side of the sling to adjust its length accordingly.

The ends of the sling cover opposing top rail portions of a shopping cart when the sling is resting between opposing sides of the shopping cart. Stiffening means located toward each end of the sling prevent the sling from folding over on itself (like typical hammocks tend to do) when under load. The sling also includes attachment means running parallel to the ends of the sling and effective for temporarily securing the sling to the top rail portion of the shopping cart. This arrangement allows a user to secure the sling to the cart using one hand and allows the infant to ride in the sling perpendicular to the sides of the shopping cart, thereby allowing access to the basket portion of the cart and use of the cart seat for other purposes. The attachment means may extend (and preferably do extend) the entire length of each end and have an arcuate-shaped open cross section. In a preferred embodiment, the attachment means is J-style hook extending the length of the each end.

A safety strap may be provided at each end of the sling to provide a redundant or secondary level of safety should one or both of the attachment means fail. Preferably, the safety strap is made of a VELCRO® hook-and-loop strap and extends through the sling and around the end of the sling. Further, the sling may include means, such as an end flange portion arranged perpendicular to the stiffening or attachment means, which is effective for preventing a leading side of the seat from being inserted into a rearward end of a second shopping cart. Another safety strap may be provided that goes around the handle of the infant car seat and secures the handle to an opposing portion of the cart.

Objects of this invention are to provide a portable infant seat that (1) is easily deployed for use with one hand; (2) safely and securely attaches along a top rail of a shopping cart while providing access to the basket portion of the cart; (3) automatically places the infant in a proper resting position with his or her head elevated; (4) allows a second child to ride in the seat portion of the cart when the portable infant seat is in use; (5) can be used with an infant car seat without causing the shopping cart to become top heavy; (6) does not rely upon straps or buckles as its main attachment means; (7) can be used in a variety of different shopping cart designs with either no adjustment or a simple adjustment to accommodate different shopping cart designs; (8) easily stows in a diaper bag or purse, or may be easily carried by hand; (9) does not become entangled with itself during storage; (10) eliminates the multiple failure points and safety hazards found in prior art designs; (11) includes redundant fastening means in case the primary fastening means fail; and (12) is simple in its construction and uses fewer components than prior art designs.

LIST OF DRAWING ELEMENTS

In the above drawing figures, the following elements and associated element numberings are used:

| | |
|---|---|
| 10 | Portable infant seat or hammock |
| 11 | Sling |
| 13 | First end |
| 14 | End of 13 |
| 15 | Second end |
| 16 | End of 15 |
| 17 | First side/side wall |
| 19 | Second side/side wall |
| 21 | First layer |
| 23 | Second layer |
| 25 | Seat belt |
| 27 | Top edge |
| 29 | Top edge |
| 30 | Attachment means |
| 31 | Open J-style hook |
| 33 | Arcuate-shaped end or open clip portion |
| 35 | Straight portion/stiffening means |
| 37 | Safety straps |
| 39 | Slot |
| 40 | Adjustment means |
| 41 | Strap |
| 43 | Buckle |
| 50 | Shopping cart |
| 51 | Basket portion |
| 53 | Forward end |
| 55 | Rearward or handlebar end |
| 57 | First side |
| 59 | Second side |
| 61 | Top rail |
| 63 | Shopping cart seat |
| 65 | Basket space below 10 |
| 70 | Infant car seat safety strap |

DETAILED DESCRIPTION OF THE PREFERRED EMBODIMENTS

Figure 1:
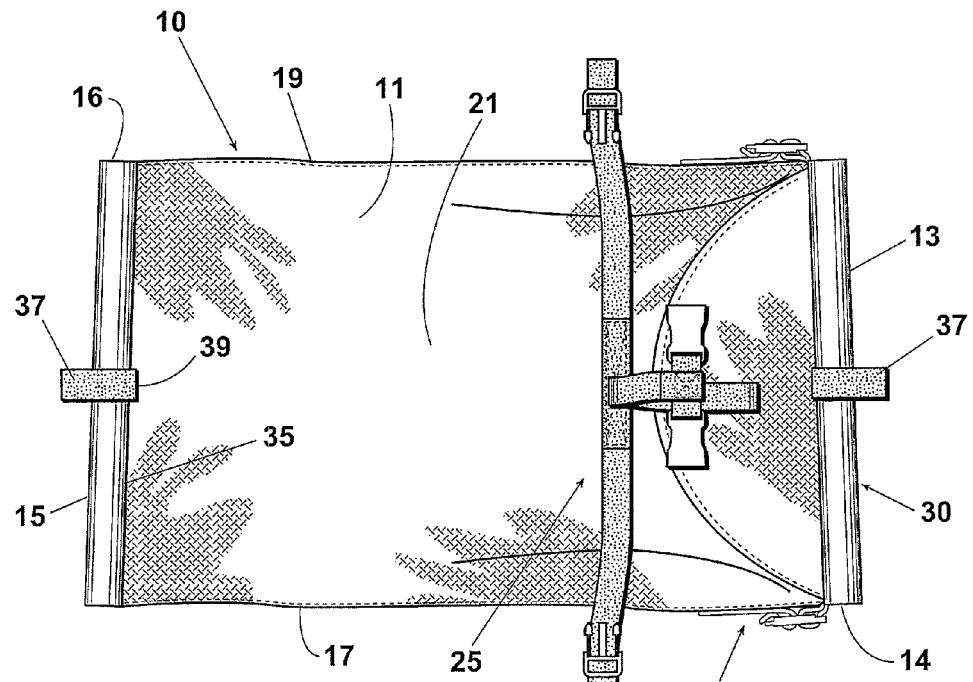
FIG. 1 is top view of a portable infant seat made and used according to this invention.
Figure 2:
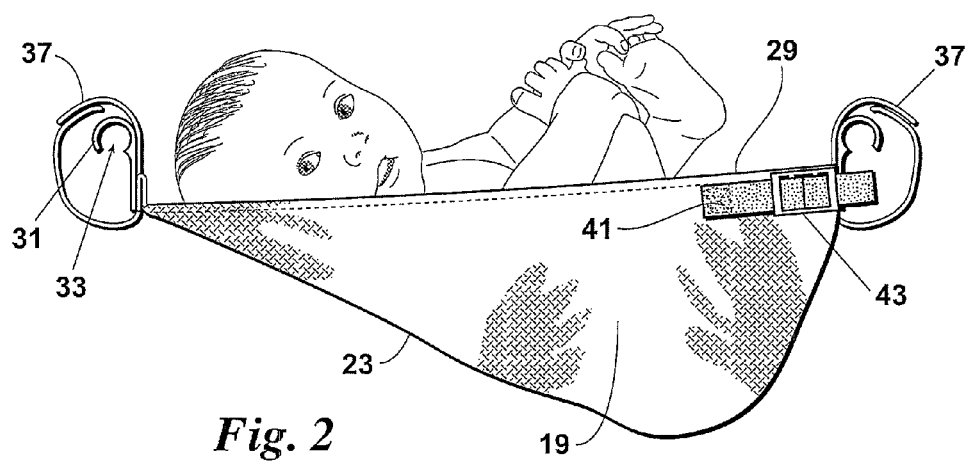
FIG. 2 is a side elevation view of the portable infant seat of FIG. 1 and illustrates the seat supporting an infant. Because of the seat's design, the infant rests in a proper position when riding in the seat, with her or his head elevated.
Figure 3:
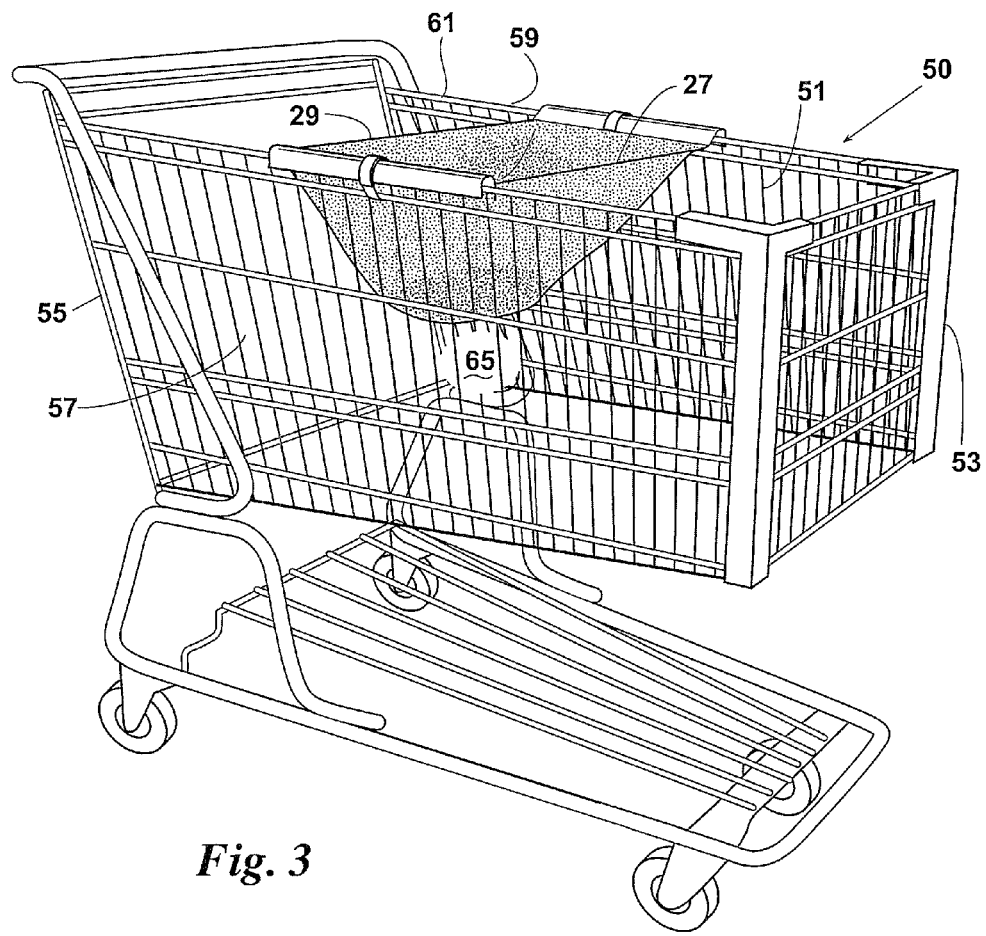
FIG. 3 is a view of the portable infant seat of FIG. 1 in its deployed state. The seat is releaseably secured to the sides of the shopping cart by an open J-style hook extending along each end of the seat. The J-hooks are flexibly secured to the sling portion of the seat and rotate upward when the hammock is placed into position along the top rail of the shopping cart. The weight of the infant provides downward force effective for keeping the J-hooks in place along the top rail of the cart. A pair of safety straps, which may be a VELCRO® hook-and-loop strap, is provided at each end of the seat to provide a redundant level of safety in case one or both of the J-hooks should fail. Adjustment means (see FIG. 1) may be provided to easily adjust the length of the seat in order to accommodate different sized shopping carts.
Figure 5:
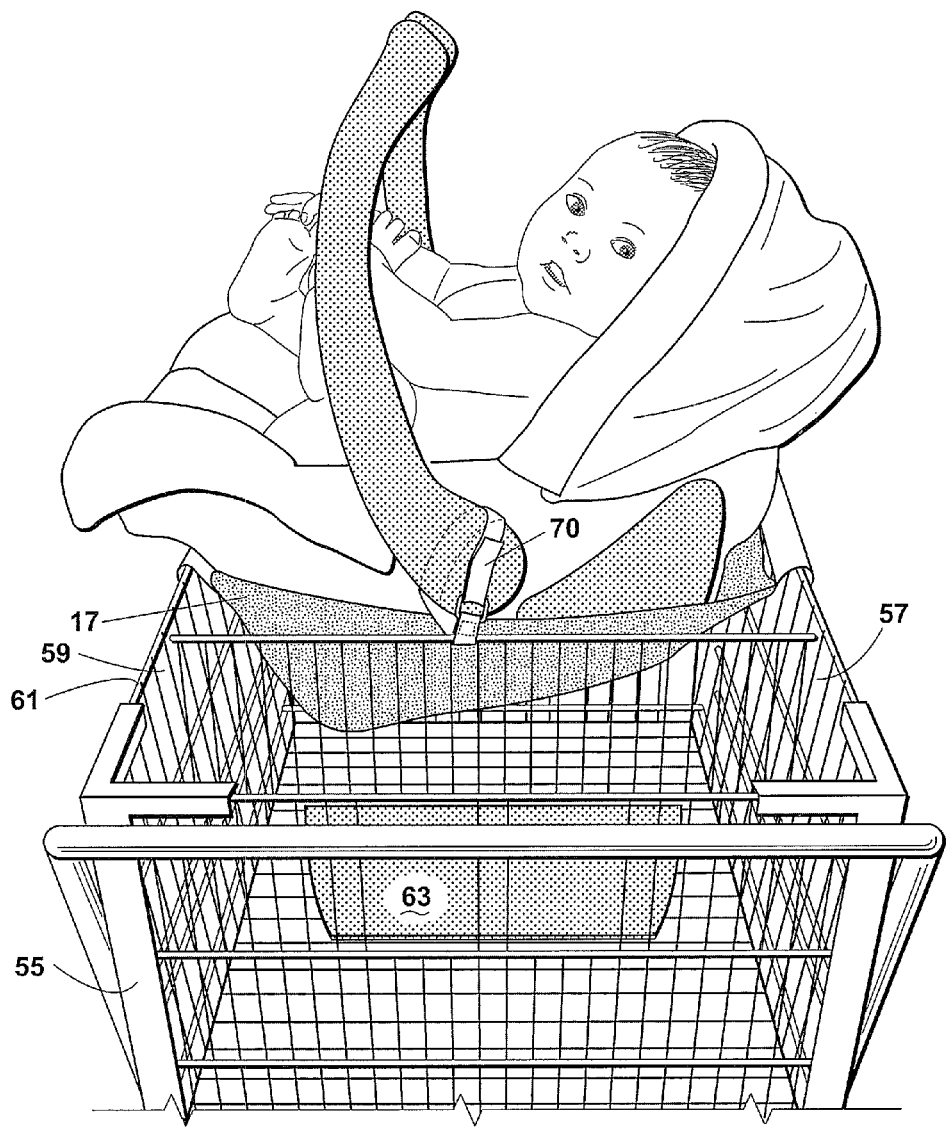
FIG. 5 is an isometric view of the portable infant seat of FIG. 1 accommodating an infant car seat. The seat receives the car seat in such a way so as to keep the infant's head elevated and not make the shopping cart itself top heavy. A safety strap may be used to further secure the infant car seat to the cart.

Referring to the drawings and first to FIGS. 1-3, a portable infant seat or hammock 10 made and used according to this invention includes a flexible sling 11 that extends between and overlaps opposing first and second sides 57, 59 of a shopping cart 50. The ends 13, 15 of the sling 11 to temporarily attach it to the top rail 61 of the cart 50, preferably toward the rearward or handlebar end 55 of the cart 50. Sling 11 may be made of fabric and may be constructed of a single or first layer 21 of fabric or a first and second layer 21, 23 of fabric (see FIGS. 1 & 2). A seat belt 25, of a type well-known in the art, is provided for safely securing an infant within the sling 11. When in the temporarily attached or secured position, an infant or infant car seat (see FIG. 5) is placed within the sling 11 so that the infant or car seat is oriented substantially parallel to the opposing flexible first and second side walls 17, 19 of sling 11 (and, therefore, substantially perpendicular to sides 57, 59 of cart 50).

The hammock 10 when in use allows for the shopping cart seat 63 to be used for a second child or to stow items such as eggs, breads, vegetables and fruits. Access to the basket 51 of the cart 50 is provided between the side wall 17 or 19 of sling 11 and the forward end 53 of the cart 50. Items also may be stowed in the space 65 lying substantially directly below hammock 10.

Figure 4:
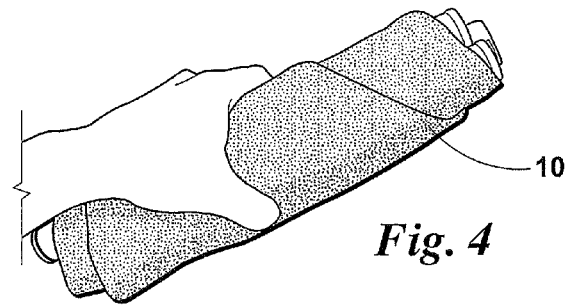
FIG. 4 is an isometric view of the portable infant seat of FIG. 1 in a rolled up and stored position. The seat is made of a flexible material and is designed to easily stow within a diaper bag or purse.

When not in use, hammock 10 may be rolled up for transport or storage (see FIG. 4). Because the straight run portion 35 of the sling provides stiffening means (e.g. J-hook 31), the hammock can only be rolled up end-to-end (13→15 or 15→13) and is prevented from being rolled up in a side-to-side direction (17→19 or 19→17). To use hammock 10, a user unrolls the hammock and hooks the ends 13, 15 to the top rail 61 of the cart 50. Each end 13, 15 can be placed in this temporarily secured position using one hand without the need for accurate placement and adjustment of straps or manual manipulation of clasps. Because the sling 11 is made of a flexible material, the attachment means 30 in the form of a J-style hook 31 located at each end 13, 15 pivots or rotates about its respective end 13, 15 as the hammock 10 is placed onto the top rail 61 of the cart 50 and put under load (see FIG. 5).

The sling 11 is shaped to cradle an infant or an infant car seat. To accomplish this, side walls 17, 19 of sling 11 are preferably scalene triangular-shaped side walls having a slightly arcuate-shaped long side or top edge 27, 29. Other shapes may be used, but the sling 11 should be designed so that when the infant rests within the sling 11, her or his head is placed in an elevated position. The same holds true when an infant rests within the infant car seat resting within the sling 11. The sling should also be designed so that when it carries an infant car seat carrying an infant, the shopping cart does not become top heavy. If sling 11 is intended only for use to carry purchased items, other shapes may be used because the need to provide a shape which elevates an infant's head is no longer desireable.

The ends 13, 15 of sling 11 lie substantially orthogonal to side walls 17, 19 and parallel to one another. Each end 13, 15 includes attachment means 30 for releaseably securing hammock 10 to the top rails 61 of cart 50. In a preferred embodiment, attachment means 30 is a J-style hook 31 secured to each end 13, 15 and preferably extending the entire length of each end 13, 15 between sides 17, 19.

J-style hook 31, which may be a molded polypropylene material, includes an arcuate-shaped open cross-section or clip 33 sized appropriately for receiving the top rail 61 of a cart 50 and safely holding the downward load presented by an infant or an infant and an infant car seat. The straight run portion 35 of J-style hook 31 extends between sides 17, 19 and provides stiffening means for the ends 13, 15 so that the hammock 10 cannot fold over onto itself when in use (that is fold in a direction parallel to its longitudinal axis). Because the straight run portion 35 stiffens each end 13, 15, the arcuate-shaped end 33 may extend for less than the entire length of each end. For example, each end 13, 15 may include two or more shorter-width arcuate- shaped ends 33 (not shown) that extend from the straight run portion 35.

Because the width of shopping carts may slightly vary (up to about 2 inches) from one kind of cart to another, adjustment means 40 are provided to adjust the length of hammock 10. In a preferred embodiment, adjustment means 40 include a strap 41 and buckle 43. Strap 41 may be a VELCRO® hook-and-loop straps or a nylon strap.

Hammock 10 may include one, and preferably two (or more), safety straps 37 inserted through slots 39 located in sling 51 toward each end 13, 15 but outside of the straight run portion 35 of J-style hook 31. The straps 37 add a redundant level of safety and piece of mind for parents and caregivers who might worry that the J-style hook 31 somehow becomes displaced from the top rail 61. Each safety strap 37 surrounds the J-style hook 31 so that if the hook 31 fails, straps 37 prevent hammock 10 from collapsing. The safety straps 37 may be any type of strap preferable. In a preferred embodiment, straps 37 are VELCRO® hook-and-loop straps. Each slot 39 should be reinforced around its perimeter to prevent any tearing in the sling 11. An additional safety strap 70 may be used to further secure an infant car seat to the cart (see FIG. 5).

Each end 13, 15 may be fitted with means such as an arcuate-shaped flange or stop (not shown) of sufficient size which arrests or prevents the forward travel of the cart 50 when a user attempts to insert cart 50 into a second cart prior to removing the hammock 10. Preferably, the preventing means are located on opposing ends 14, 16 of each end 13, 15. In this way, regardless of which end 13, 15 is attached to which cart side 57, 59, at least one preventing means will be located on the leading side 17, 19 of the sling 11. Alternately, J-shaped hook 31 may have additional wall thickness at ends 14, 16 to provide for an interference fit and prevent cart 50 from being inserted into the second cart when hammock 10 is in use.

While preferred embodiments of a portable infant seat or hammock have been described with a certain degree of particularity, many changes may be made in the details of its construction without departing from the spirit and scope of this disclosure. Therefore, the scope of the invention is limited only by the following claims and their equivalents.

What is claimed is:

1. A portable infant seat comprising
a flexible sling having opposing ends and opposing side walls; and
attachment means located at each opposing end for temporarily attaching each opposing end to a supporting structure, the attachment means being arcuate-shaped with an open cross-section and running parallel to each opposing end and providing stiffening means;
the stiffening means allowing the flexible sling to move between an unrolled and a rolled position in an end-to-end direction and preventing the flexible sling from moving between an unrolled and a rolled position in a side-to-side direction when the flexible sling is not attached to the supporting structure.

2. A portable infant seat according to claim 1 further comprising the opposing side walls being triangular-shaped.

3. A portable infant seat according to claim 1 further comprising the triangular- shaped opposing side walls being scalene-shaped.

4. A portable infant seat according to claim 1 further comprising the attachment means extending the length of each opposing end.

5. A portable infant seat according to claim 1 further comprising the attachment means not having a clasp-type closing mechanism.

6. A portable infant seat according to claim 1 further comprising the flexible sling having at least one safety strap.

7. A portable infant seat according to claim 6 further comprising the at least one safety strap passing through a portion of the flexible sling.

8. A portable infant seat according to claim 1 wherein the arcuate-shaped attachment means have a same length as each opposing end.

9. A portable infant seat according to claim 1 wherein the supporting structure is an upper end of a longitudinally extending side of the supporting structure.

10. A portable infant seat according to claim 1 wherein the supporting structure is a longitudinally extending top rail of a shopping cart.

11. A portable infant seat according to claim 1 wherein the attachment means run parallel to the supporting structure when the flexible sling is in use and attached to the supporting structure 12. A portable infant seat according to claim 1 further comprising a seat belt attached to the flexible sling.

* * * * *